United States Patent [19]

Andrä

[11] Patent Number: 5,024,120
[45] Date of Patent: Jun. 18, 1991

[54] TORSIONAL VIBRATION DAMPER WITH AN UNDULATING DAMPING RING

[75] Inventor: Rainer H. Andrä, Limburg, Fed. Rep. of Germany

[73] Assignee: Firma Carl Freudenberg, Weinheim/Bergstr., Fed. Rep. of Germany

[21] Appl. No.: 388,234

[22] Filed: Aug. 1, 1989

[30] Foreign Application Priority Data

Aug. 1, 1988 [DE] Fed. Rep. of Germany ....... 3826088

[51] Int. Cl.$^5$ .............................................. F16F 15/10
[52] U.S. Cl. .......................................... 74/574; 74/572
[58] Field of Search .................... 74/574, 572, 573 R; 464/90, 89, 85, 93

[56] References Cited

U.S. PATENT DOCUMENTS

| 4,380,442 | 4/1983 | Amsel ................................... 464/93 |
| 4,395,809 | 8/1983 | Whiteley ........................... 74/574 X |
| 4,558,773 | 12/1985 | Schäfer . |
| 4,693,354 | 9/1987 | Umeyama et al. ................ 464/85 X |
| 4,714,450 | 12/1987 | Byrnes et al. ........................ 464/90 |
| 4,825,983 | 5/1989 | Nakanishi ........................ 74/574 X |

FOREIGN PATENT DOCUMENTS

| 692668 | 8/1964 | Canada .................................. 74/574 |
| 0021975 | 1/1981 | European Pat. Off. .............. 74/574 |
| 0081968 | 6/1983 | European Pat. Off. .............. 74/574 |
| 0298428 | 1/1989 | European Pat. Off. .............. 74/574 |
| 676453 | 5/1939 | Fed. Rep. of Germany ........ 74/574 |
| 1143679 | 2/1963 | Fed. Rep. of Germany ........ 74/574 |
| 1997151 | 11/1968 | Fed. Rep. of Germany ........ 74/574 |
| 2250890 | 4/1974 | Fed. Rep. of Germany ........ 74/574 |
| 3545401 | 7/1987 | Fed. Rep. of Germany ........ 74/574 |
| 0226727 | 12/1984 | Japan ................................... 74/574 |
| 282188 | 12/1927 | United Kingdom ................. 74/574 |
| 522288 | 6/1940 | United Kingdom ................. 74/574 |
| 828354 | 2/1960 | United Kingdom ................. 74/574 |
| 914240 | 12/1962 | United Kingdom ................. 74/574 |
| 1389735 | 4/1975 | United Kingdom ................. 74/574 |
| 3535859 | 4/1987 | United Kingdom ................. 74/574 |

*Primary Examiner*—Vinh T. Luong
*Attorney, Agent, or Firm*—Kenyon & Kenyon

[57] ABSTRACT

A torsional vibration damper having a longitudinal axis of rotation includes a central hub and a rotatable inertial ring surrounding the central hub that are connected together by a damping element arranged in the clearance space between the hub and inertial ring. The damping element comprises an outer ring, an inner ring and a flange ring disposed therebetween. The outer ring is connected between substantially axially, opposed adhesive surfaces of the inertial ring and the flange ring, respectively. The inner ring is connected between substantially radially opposed, adhesive surfaces of the flange ring and the hub ring. The adhesive surfaces of the hub ring and the flange ring each surround the axis of rotation at a radial distance that continuously varies along the circumferential direction.

10 Claims, 1 Drawing Sheet

TORSIONAL VIBRATION DAMPER WITH AN UNDULATING DAMPING RING

BACKGROUND OF THE INVENTION

The invention relates generally to a torsional vibration dampers and, more particularly, to an improved torsional vibration damper of reduced volume and weight having inner and outer damping rings providing circumferential and longitudinal flexibility.

A torsional vibration damper having a longitudinal axis of rotation in which a central hub ring having means for connection to a part to be damped and a rotatable inertial ring surrounding the central hub to form a clearance space therebetween is disclosed in U.S. Pat. No. 4,558,773. In this patent, a damping element is disposed in the clearance space. The damping element includes an outer ring and inner ring in which the outer ring is connected on axially opposed, adhesive surfaces of the inertial ring and of a flange, while the inner ring is connected on radially opposed, adhesiVe surfaces of the central hub and the flange. In dampers of this type, the circumferential and longitudinal flexibility of the damper can be adjusted independently of each other through appropriate selection of the inner and outer rings. However, in order to achieve the independent adjustability, the volume and weight of the damper are sacrificed as the space between the hub and inertial ring is not efficiently utilized.

SUMMARY OF THE INVENTION

Thus, one of the problems to which the invention is directed is provision of a torsional vibration damper having longitudinal and circumferential flexibility, which can be adjusted independently to specific values, in which the space between the central hub and inertial ring is efficiently utilized to optimize the volume and weight of the damper.

The invention solves this problem by providing a torsional vibration damper having a longitudinal axis of rotation in which a central hub having means for connection to a part to be damped is surrounded by a rotatable inertial ring to form a clearance space therebetween. A damping element is s disposed in the clearance space. The damping element includes a radially inner ring, a radially outer ring, and a flange ring disposed between the radially inner and radially outer rings. First and second substantially axially opposed, adhesive surfaces are formed on the inertial ring and the flange ring, respectively, and the radially outer ring is connected between the first and second adhesive surfaces. Third and fourth substantially radially opposed, adhesive surfaces are formed on the flange ring and the central hub, respectively. The radially inner ring is connected between the third and fourth adhesive surfaces. The third and fourth adhesive surfaces each surround the longitudinal axis of rotation at a radial distance that continuously varies along the circumferential direction of the damper.

In the torsional vibration damper of the invention the radially inner ring is connected between the central hub and the flange ring by adhesive surfaces, each of which surround and are spaced at continuously varying radial distances from the axis of rotation. With this construction, a relatively reduced volume and weight compared to prior dampers of this type is achievable and the flange ring has excellent longitudinal flexibility relative to the central hub. Also, no adverse affect on the circumferential flexibility of the central hub relative to the inertial ring is produced.

The radially outer ring in particular contributes to this latter effect. This ring is fixed in the axial direction between the essentially radially extending, first and second adhesive surfaces of the flange ring and inertial ring. If the damper is designed as a rotating torsional vibration damper, the outer ring is cooled very efficiently by the passing air. The comparatively greater, elastic deformations of the outer ring, which may be formed from rubber, therefore cannot detrimentally alter the properties of the rubber material via an increase in temperature. This also makes it possible to manufacture the outer ring from a highly flexible rubber material without difficulty and, therefore, to increase the expansion capability of the outer ring and of the flange ring in the radial direction.

Continuously changing radial distances between the third and fourth adhesive surfaces, respectively, and the axis of rotation are produced, for example, when the adhesive surfaces are undulated in the circumferential direction. In such a case, adjacent circumferential subsections of the adhesive surfaces, which are spaced at different distances from the axis of rotation, uniformly merge into one another. This allows at least the central hub of the torsional vibration damper of the invention to be produced from initially flat sheet metal by using a deep-drawing process, which produces a hub having a cup-shaped housing. With such a construction, the inherent stability produced is extremely good.

It is particularly advantageous with respect to provision of favorable conditions for the dissipation of heat, if the radially outer portion of the central hub forms an acute angle with the longitudinal axis of the torsional Vibration damper such that a widening of the cup-shaped housing occurs. This results not only in a relative increase in the available surface area, but also an improved discharge action of the passing air. Also, the heat produced in the radially inner ring of the torsional vibration damper of the invention, when flexural or transverse vibrations are introduced, is dissipated in this manner, thereby obviating the danger that the material forming the cup-shaped housing of the inner ring will be damaged.

Due to the relatively enlarged adhesive surfaces of the flange ring and of the radially inner and radially outer rubber damping rings of the torsional vibration damper of the invention, it is possible to produce the flange ring from plastic. This is advantageous because plastic is a material having an especially low weight by volume. This type of construction distinctly improves the damping effectiveness of the torsional vibration damper of the invention. The use of reinforced plastic and aluminum has proven to be an especially well-suited material for manufacturing the flange ring of the invention.

The radial space between the central hub and the inertial ring of the torsional vibration damper of the invention can be efficiently utilized by substantially filling it completely with the inner ring, the outer ring and the flange ring. Especially in cases where the flange ring is made of plastic, the resulting construction has optimum damping effectiveness with regard to the volume and weight of the damper. Moreover, the damping effectiveness in the axial direction and in the circumferential direction is independently optimized and, thereby, an especially good adaptability to various applications is obtained.

Another advantageous aspect of the invention is the ease with which it is possible to manufacture the torsional vibration damper of the invention from generally known techniques.

Further features, advantages and embodiments of the invention are apparent from consideration of the following detailed description, drawings and appended claims.

DETAILED DESCRIPTION

Figure 1:
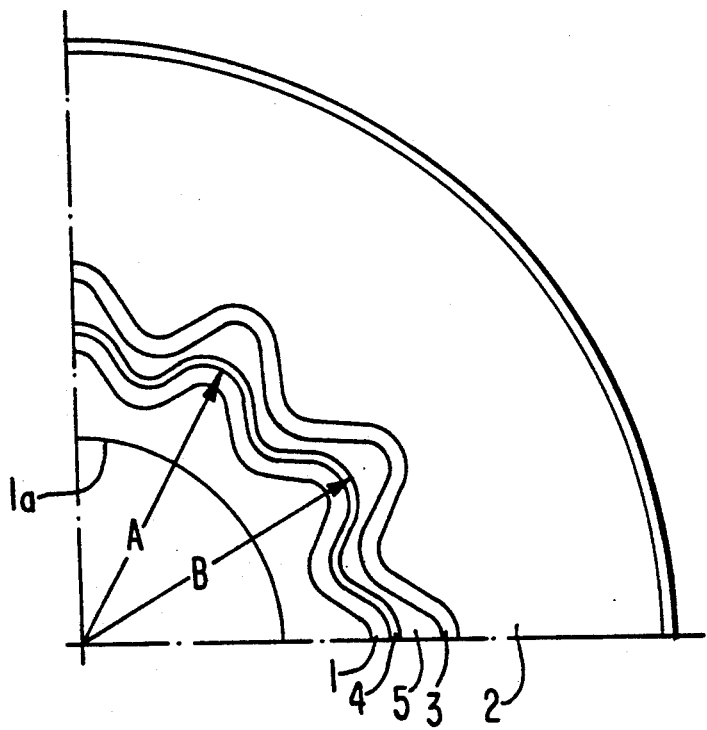
FIG. 1 illustrates a front view taken from the left side of FIG. 2 of a ninety degree section of a torsional vibration damper constructed according to the principles of the invention.
Figure 2:
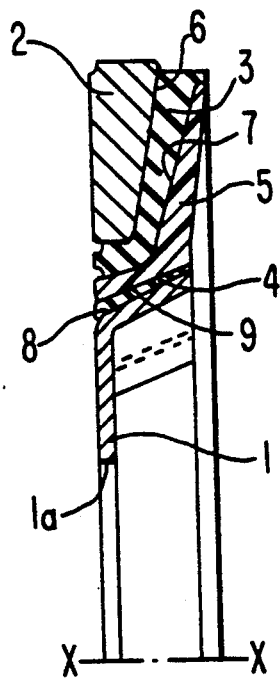
FIG. 2 illustrates a cross sectional view taken along line 2—2 of the portion of the torsional vibration damper shown in FIG. 1.

The torsional vibration damper of the invention comprises a central hub ring 1, which forms means for connecting the damper to the shaft which in use is connected to a part to be damped such as a shaft (not shown) extending through aperture 1a, and an inertial ring 2 rotatable relative to central hub 1 about longitudinal axis of rotation x—x. The central hub 1 and ring 2 are connected to each other via a damping element arranged in the radial space between the hub 1 and ring 2. The damping element comprises an outer ring 3, flange ring 5 and an inner ring 4. The outer ring 3 is bonded to substantially axially opposed, adhesive surfaces 6, 7 of the inertial ring 2 and the flange ring 5, respectively. The inner ring 4 is bonded to substantially radially opposed, adhesive surfaces 8, 9, respectively, of the hub 1 and the flange ring 5.

The outer ring 3 and the inner ring 4 may be formed from rubber mixtures of respective compositions that deviate from each other to achieve differing damping effects in the circumferential and longitudinal directions. The particular compositions used are optimally chosen to meet the requirements of the particular application for which the torsional vibration damper of the invention may be used.

The adhesive surfaces 8, 9 of the hub ring 1 and of the flange ring 5, respectively, define the radial inner and outer portions of the inner ring 4 and surround the axis of rotation at a radial distance A, B, respectively, which varies continuously in the circumferential direction. The variable radial distances result in a continual waviness, which increases the surface area of both adhesive surfaces compared to that of circular surfaces, for example. With this type of design and, particularly if the flange ring 5 is made of plastic and aluminum, the fear of the inner rubber ring 4 tearing under normal operating conditions is obviated.

The central hub ring 1 is made from a deep-drawn sheet metal process to produce an essentially cup-shaped housing. The outermost portion of ring 1 also has a wavy or undulating shape in the circumferential direction, which radially widens from the bottom of the cup-shaped housing toward the top opening of the cup-shaped housing. With this construction, a good rubber action is obtained in rotatable torsional vibration dampers, which provides an adequate guarantee that the inner ring 4 will be sufficiently cooled under normal operating conditions.

In the illustrated embodiment, the outer ring 3 especially must absorb torsional stress. As a result, this ring undergoes a considerable degree of elastic deformation, particularly in the region of its outer surface. However, this deformation cannot lead to an increase in temperature, which would cause damage to the material of ring 3, due to the good cooling action produced by the closely adjacent, axially extending sections of the inertial ring 2 and the flange ring 5. Even extreme torsional vibrations can be easily absorbed with this type of construction.

What is claimed is:

1. A torsional vibration damper having a longitudinal axis of rotation comprising:
   (a) a central hub having means for connection to a part to be damped;
   (b) a rotatable inertial ring surrounding the central hub to form a clearance space therebetween;
   (c) a damping element disposed in said clearance space, said damping element including
      (i) a longitudinally flexible radially inner ring;
      (ii) a circumferentially flexible radially outer ring; and
      (iii) a flange ring disposed between said radially inner and radially outer rings;
   (d) first and second substantially axially opposed, adhesive surfaces formed on said inertial ring and said flange ring, respectively, said radially outer ring being connected between said first and second adhesive surfaces to damp circumferential vibrations; and
   (e) third and fourth substantially radially opposed, adhesive surfaces formed on said flange ring and said central hub, respectively, said radially inner ring being connected between said third and fourth adhesive surfaces to damp longitudinal vibrations, each of said third and fourth adhesive surfaces surrounding the longitudinal axis of rotation at a radial distance that continuously varies in the circumferential direction.

2. The torsional vibration damper of claim 1 wherein said third and fourth adhesive surfaces undulate in the circumferential direction.

3. The torsional vibration damper of claim 1 wherein said flange ring is formed from plastic.

4. The torsional vibration damper of claim 2 wherein said flange ring is formed from plastic.

5. The torsional vibration damper of claim 1 wherein said clearance space is completely filled by said radially inner ring, said flange ring and said radially outer ring.

6. The torsional vibration damper of claim 2 wherein said clearance space is completely filled by said radially inner ring, said flange ring and said radially outer ring.

7. The torsional vibration damper of claim 3 wherein said clearance space is completely filled by said radially inner ring, said flange ring and said radially outer ring.

8. The torsional vibration damper of claim 4 wherein said clearance space is completely filled by said radially inner ring, said flange ring and said radially outer ring.

9. The torsional vibration of claim 1 wherein said radially inner and radially outer rings are formed from an elastomeric material.

10. The torsional vibration of claim 9 wherein the compositions of the elastomeric material forming said radially inner and radially outer rings are different.

* * * * *

UNITED STATES PATENT AND TRADEMARK OFFICE
CERTIFICATE OF CORRECTION

PATENT NO. : 5,024,120
DATED : June 18, 1991
INVENTOR(S) : Rainer H. Andrä

It is certified that error appears in the above-identified patent and that said Letters Patent is hereby corrected as shown below:

Column 1, line 44, should read --A damping element is disposed in the clearance--

Column 3, line 19, should read --lines 2-2 of the portion-- line 24, change "...a central hub ring 1," to read --...a central hub ring 1a--

Signed and Sealed this

Eighth Day of December, 1992

Attest:

DOUGLAS B. COMER

Attesting Officer     Acting Commissioner of Patents and Trademarks